(No Model.)

F. P. SHOREY.
SHOE LACE, &c.

No. 293,599. Patented Feb. 12, 1884.

WITNESSES:
Fred. G. Dieterich.
Arthur L. Morsell.

Frank P. Shorey
INVENTOR.
By Louis Bagger & Co.
ATTORNEYS.

UNITED STATES PATENT OFFICE.

FRANK P. SHOREY, OF AUBURN, NEW YORK, ASSIGNOR OF ONE-HALF TO SAMUEL S. WOOD, OF SAME PLACE.

SHOE-LACE, &c.

SPECIFICATION forming part of Letters Patent No. 293,599, dated February 12, 1884.

Application filed December 10, 1883. (No model.)

*To all whom it may concern:*

Be it known that I, FRANK P. SHOREY, a citizen of the United States, and a resident of Auburn, in the county of Cayuga and State of New York, have invented certain new and useful Improvements in Shoe-Laces; and I do hereby declare that the following is a full, clear, and exact description of the invention, which will enable others skilled in the art to which it appertains to make and use the same, reference being had to the accompanying drawings, which form a part of this specification, and in which—

Figure 1:
Figure 2:
Figure 3:
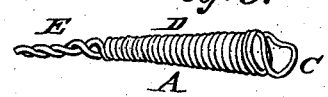

Figure 1 represents one end of my improved shoe-lace. Fig. 2 is a longitudinal sectional view of the same; and Fig. 3 is a perspective view of the twisted-wire tag with the lace removed, to more clearly illustrate its detailed construction.
Similar letters of reference indicate corresponding parts in all the figures.

My invention has relation to metallic "tags" or stiffeners for the ends of laces for shoes, corsets, and analogous purposes; and it consists in the construction of a tag or stiffener of twisted wire, as hereinafter more fully described and claimed.

I form this stiffener by inserting a piece of wire, A, through the lace, (shown at B,) a short distance from the end which is to be stiffened. I then bend or double the piece of wire upon itself, so as to form a loop, C, at the point where it is inserted through the lace, and twist the doubled ends of the wire spirally around each other and around the end of the lace or cord, as shown at D. This operation of twisting the wire compacts the free end of the lace or cord and effectually prevents it from unraveling. It also forms a tapering tag, the pointed end of which, E, is formed simply by the two ends of the wire twisted spirally around each other, so that the tag may be easily inserted through its appropriate eyelet. This tag being fastened to its appropriate end of the lace by the loop C inserted through the lace, it will be seen that the tag cannot possibly become detached, as with the metallic tags or stiffeners ordinarily used. As it is made of wire, the cost is merely nominal, and with the aid of proper machinery the wire may be inserted through and doubled around the ends of the lace and twisted to form the tag in a very brief space of time.

Having thus described my invention, I claim and desire to secure by Letters Patent of the United States—

As an improvement in laces or lace-cords for shoes, corsets, and analogous purposes, the tag or stiffener composed of a piece of wire inserted through the lace or cord near its end, and then doubled upon itself and twisted in two spirals around the free end of the lace or cord and around itself, to form a pointed end, substantially as shown and set forth.

In testimony that I claim the foregoing as my own I have hereunto affixed my signature in presence of two witnesses.

FRANK P. SHOREY.

Witnesses:
CHESTER S. BILLS,
JAMES VANSTON.